US006707956B1

(12) United States Patent
Kim et al.

(10) Patent No.: US 6,707,956 B1
(45) Date of Patent: Mar. 16, 2004

(54) APPARATUS FOR FABRICATING APODIZED FIBER GRATING

(75) Inventors: Se-Yoon Kim, Anyang-shi (KR); Sang-Gil Shin, Yongin-shi (KR); Min-Sung Kim, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 09/608,134

(22) Filed: Jun. 30, 2000

(30) Foreign Application Priority Data

Jul. 2, 1999 (KR) .............................. 99-26671

(51) Int. Cl.[7] .............................................. G02F 1/295
(52) U.S. Cl. .............................. 385/10; 385/37; 385/19; 385/124; 385/28; 385/29; 385/27
(58) Field of Search ................................ 385/10, 37, 19, 385/124, 27, 28, 29

(56) References Cited

U.S. PATENT DOCUMENTS

| | | | | |
|---|---|---|---|---|
| 5,652,818 A | * | 7/1997 | Byron | 385/37 |
| 5,712,715 A | | 1/1998 | Erdogan et al. | 359/8 |
| 5,717,799 A | | 2/1998 | Robinson | 385/37 |
| 5,912,999 A | | 6/1999 | Brennan, III et al. | 385/37 |
| 5,953,472 A | | 9/1999 | Boschis et al. | 385/37 |
| 6,035,083 A | | 3/2000 | Brennan, III et al. | 385/37 |
| 6,043,497 A | | 3/2000 | Quetel et al. | 250/492.1 |

OTHER PUBLICATIONS

H. Singh, "Apodized fiber Bragg for DWDM applications using uniform phase mask", ECOC '98 9/1998, pp. 189–190.*

* cited by examiner

Primary Examiner—Drew Dunn
Assistant Examiner—Leo Boutsikaris
(74) Attorney, Agent, or Firm—Robert E. Bushnell, Esq.

(57) ABSTRACT

There is provided an apparatus for fabricating an apodized fiber grating. In the apodized fiber grating fabricating apparatus, a UV (Ultraviolet) laser emits a UV laser beam, a beam splitter splits the UV laser beam emitted from the UV laser into two beams, a plurality of mirrors form light paths to concurrently project the split beams onto an optical fiber from two directions by reflecting the split beams, a phase mask passes the reflected beams therethrough in such a way to form gratings in the optical fiber in a predetermined period, a first blocking device is disposed between the phase mask and one of the mirrors, progressively blocks one of the two beams from being projected toward the optical fiber from one direction, and provides apodization to the formed gratings, and a second blocking device, which is mobile and opposite to the first blocking device with respect to the optical fiber, progressively blocks the other beam from being projected toward the optical fiber from another direction and provides apodization to the formed gratings, so that an average refractive index variation is constant across the whole gratings.

35 Claims, 7 Drawing Sheets

APPARATUS FOR FABRICATING APODIZED FIBER GRATING

CLAIM OF PRIORITY

This application claims priority to an application entitled An Apparatus for Fabricating Apodized Fiber Grating filed in the Korean Industrial Property Office on Jul. 2, 1999 and assigned Serial No. 99-26671, the contents of which are hereby incorporated by reference.

BACKGROUND OF THE INVENTION

1. Field of the Invention

The present invention relates generally to fiber gratings, and in particular, to an apparatus for fabricating apodized fiber gratings.

2. Description of the Related Art

As the data transmission capacity of a WDM (Wavelength Division Multiplexing) system increases, channel spacing gets narrower. Therefore, there is an increasing need for optical filters that have a narrow bandwidth and excellent adjacent channel isolation characteristics.

Fiber gratings satisfy the requirements of such optical filters, i.e., low loss, low polarization dependence, and high channel selectivity. Further, the cost effectiveness of the fiber gratings makes them popular as optical filters.

When a general fiber grating is fabricated in a conventional method using an excimer laser and a uniform phase mask, the refractive index of the fiber is constant over the length of the grating. In such a fiber, however, a sidelobe occurs and as a result, no apodization is achieved at the fiber grating. This sidelobe can be reduced by apodizing the fiber grating such that the magnitude of a refractive index variation is decreased toward the ends of the fiber grating.

An apodized fiber grating refers to a fiber grating of which the refractive index increases or decreases toward the center or both ends. The apodized fiber grating shows minimized sidelobes in both a short wavelength band and a long wavelength band. Although this apodization is effective in reducing a sidelobe in a longer wavelength band, it has limitations in reducing a sidelobe in a shorter wavelength band due to self-induced chirping of a fiber grating.

The self-induced chirping is attributed to an inconstant average refractive index of the fiber grating. Accordingly, the average refractive index should be made constant with respect to grating length in order to reduce a sidelobe which arises from the self-induced chirping.

Other conventional fiber grating apodizing methods besides the conventional method discussed above include overlap writing, use of a PZT (Piezo Transducer), optical scanning, and use of a spatial filter. The overlap writing method is called an interference method, in which apodization is achieved by writing gratings superimposed on other gratings of different periods and sizes in an optical fiber.

As another conventional apodization method, gratings are written on an optical fiber while a tensile force is applied to the optical fiber using a piezo transducer. During writing the gratings, the optical fiber or a phase mask is vibrated for a desired length in the length direction of the optical fiber by the use of the piezo transducer.

Thirdly, apodized gratings are written by scanning an optical fiber covered with a phase mask with UV (Ultraviolet) light lengthwise with different light intensities at different scanning rates.

A spatial filter operates based on light interference. In this method, the intensity of interference light passed through a diffraction slit exhibits a Gaussian distribution. A spatial filter with a different transmission is disposed before a phase mask along the length direction of an optical fiber and UV light is projected onto the phase mask.

Other examples of fiber gratings and manufacturing methods of the conventional art are seen in the following U.S. Patents. U.S. Pat. No. 5,712,715, to Erdogan et al., entitled OPTICAL TRANSMISSION SYSTEM WITH SPATIALLY-VARYING BRAGG REFLECTOR, describes a Bragg grating produced using two collimated non-collinear beams to form an interference pattern.

U.S. Pat. No. 5,717,799, to Robinson, entitled OPTICAL WAVEGUIDE FILTERS, describes a reflection pass-band filter with particular chirp and apodization profiles. The apodized grating is produced by varying the strength of the writing of the grating elements as a function of distance along the fiber.

U.S. Pat. No. 5,912,999, to Brennan III et al., entitled METHOD FOR FABRICATION OF IN-LINE OPTICAL WAVEGUIDE GRATING OF ANY LENGTH, describes a method and apparatus for writing apodized Bragg gratings. In this method, the intensity of the writing beam is varied to control the envelope of the refractive index profile to write an apodized grating.

U.S. Pat. No. 5,953,472, to Boschis et al., entitled METHOD OF AND A DEVICE FOR MAKING BRAGG GRATINGS IN OPTICAL FIBERS OR WAVEGUIDES, describes a method of making gratings in which the fiber is illuminated through a phase mask. A diaphragm is used to give the beam a Gaussian intensity distribution.

U.S. Pat. No. 6,035,083, to Brennan III et al. entitled METHOD FOR WRITING ARBITRARY INDEX PERTURBATIONS IN A WAVEGUIDING STRUCTURE, describes a method in which a waveguide is translated relative to a writing beam, and the writing beam is modulated as a function of time to write the grating. Apodization can be achieved by controlling the amplitude envelope of the writing beam modulation.

U.S. Pat. No. 6,043,497, to Quetel et al., entitled PHOTO-IMPRINTING STAND FOR THE MAKING OF BRAGG GRATINGS, describes a photo-imprinting stand which has a dynamic masking device with a variable surface. The dynamic device may have a rotating shutter with a particular profile, and masks UV rays during the photo-imprinting process.

The above conventional apodized fiber grating fabricating methods have the following problems:

(1) In overlap writing, a device for accurately controlling a length smaller than a grating period is required for appropriate overlapped writing, thereby making it complicated to fabricate fiber gratings;

(2) In the use of a piezo transducer, it is also difficult to control a length smaller than a grating period reliably;

(3) In optical scanning, the optical scanning rate and optical intensity must be controlled appropriately to obtain a desired apodized grating; and (4) With use of a spatial filter, vibrations must be prevented since gratings are fabricated using interference patterns, and for this purpose an expensive device is required.

Especially, when a fiber grating is fabricated using a phase mask, the phase mask should be fabricated by focused ion beam implantation and wet etching to have an effective profile. A new phase mask is needed at every change in apodization conditions. Therefore, this method is not effective in terms of cost and flexibility.

Despite the advantage of production of gratings with various characteristics, the method of scanning an optical fiber lengthwise with UV light at a controlled light intensity has the distinctive shortcomings of long fabrication time and bad reproducibility.

Consequently, the method using an apodizing phase mask is not effective in terms of cost and flexibility since a phase mask is difficult to fabricate and a new phase mask is needed at every change in apodization conditions. Moreover, the beam scanning method has the disadvantages of difficult fabrication, long fabrication time, and bad reproducibility.

SUMMARY OF THE INVENTION

It is therefore an object of the present invention to provide an improved method and apparatus for fabricating an apodized fiber grating.

A further object of the invention is to provide a method and apparatus for fabricating an apodized fiber grating with a short fabrication time.

A yet further object is to provide a method and apparatus for fabricating an apodized grating with high reproducibility.

A still further object of the invention is to provide a method and apparatus for fabricating an apodized grating which are less expensive.

Another object of the invention is to provide an apparatus which does not require expensive vibration damping equipment.

Yet another object of the invention is to provide an apparatus and method which do not require a separate phase mask for different apodization conditions.

Still another object of the present invention to provide an apparatus for fabricating an apodized fiber grating readily using a beam splitter and a screen mask.

Yet another object of the present invention to provide an apparatus for fabricating an apodized fiber grating with a uniform refractive index distribution in the length direction.

To achieve the above objects, in an apodized fiber grating fabricating apparatus according one aspect of the present invention, a UV (Ultraviolet) laser emits a UV laser beam, a beam splitter splits the UV laser beam emitted from the UV laser into two beams, a plurality of mirrors form light paths to concurrently project the split beams onto an optical fiber from two directions by reflecting the split beams, a phase mask passes the reflected beams therethrough in such a way to form gratings in the optical fiber in a predetermined period, a first blocking device is disposed between the phase mask and one of the mirrors, progressively blocks one of the two beams from being projected toward the optical fiber from one direction, and provides apodization to the formed gratings, and a second blocking device, which is mobile and opposite to the first blocking device with respect to the optical fiber, progressively blocks the other beam from being projected toward the optical fiber from another direction and provides apodization to the formed gratings, so that an average refractive index variation is constant across the whole gratings.

In an apodized fiber grating fabricating apparatus according to another aspect of the present invention, a first UV laser emits a first UV laser beam toward an optical fiber from one direction and a second UV laser emits a second UV laser beam toward the optical fiber from an opposite direction. A phase mask forms gratings in the optical fiber in a predetermined period by reinforcement and interference of the first UV laser beam. A first blocking device, disposed between the first UV laser and the phase mask, progressively blocks one of the beams from being projected to the optical fiber and thus provides apodization to the formed gratings, and a second blocking device opposite to the first blocking device with respect to the optical fiber, progressively blocks the other beam from being projected to the optical fiber and provides apodization to the formed gratings, so that an average refractive index variation is constant across the whole gratings.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

Figure 1:
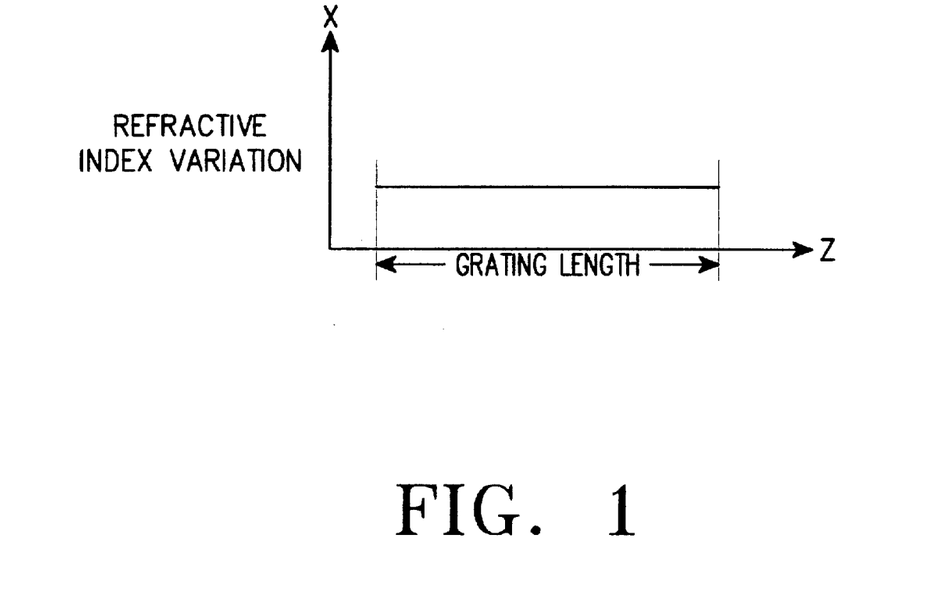
FIG. 1 is a graph showing the variation of a refractive index in the length direction of a general fiber grating fabricated using a uniform phase mask in a conventional method.

Turning now to the drawings, when a general fiber grating is fabricated in a conventional method using an excimer laser and a uniform phase mask, as discussed above, the refractive index varies on the whole as shown in FIG. 1. As indicated by a one-dot-dashed line (1) in FIG. 11, a sidelobe occurs and as a result, no apodization is achieved at the fiber grating.

Figure 2:
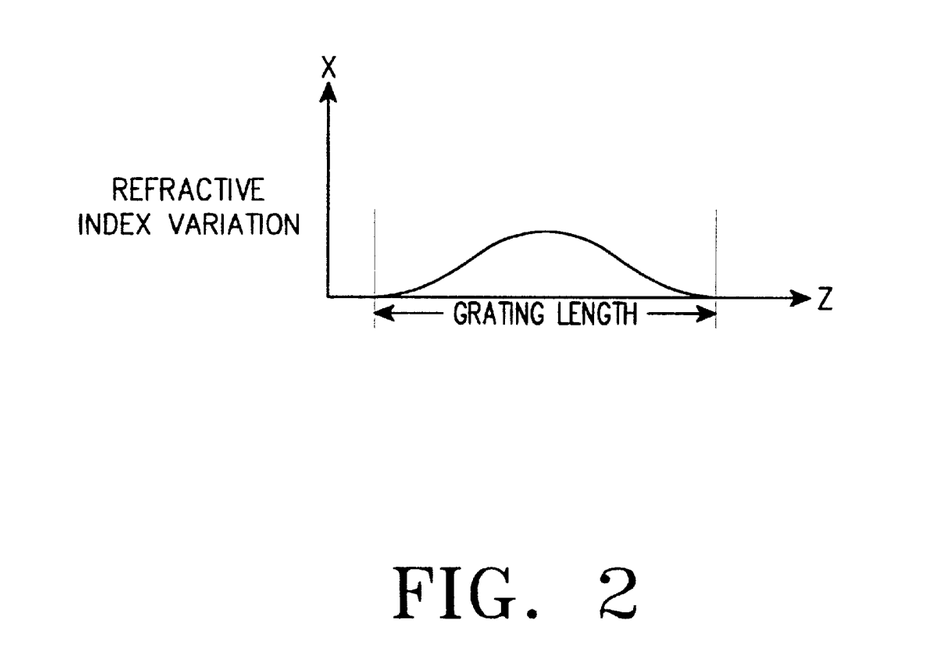
FIG. 2 is a graph showing the variation of a refractive index in the length direction of an apodized fiber grating fabricated in another conventional method.

This sidelobe can be reduced by apodizing the fiber grating such that the magnitude of a refractive index variation decreases toward the ends of the fiber grating. Another one-dot-dashed line (2) in FIG. 11 indicates the variation in the refractive index of an apodized fiber grating. The self-induced chirping of such an apodized grating, as discussed above, is attributed to an inconstant average refractive index of the fiber grating as shown in FIG. 2.

Preferred embodiments of the present invention will be described hereinbelow with reference to the accompanying drawings. In the following description, well-known functions or constructions are not described in detail where they would obscure the invention in unnecessary detail.

Figure 3:
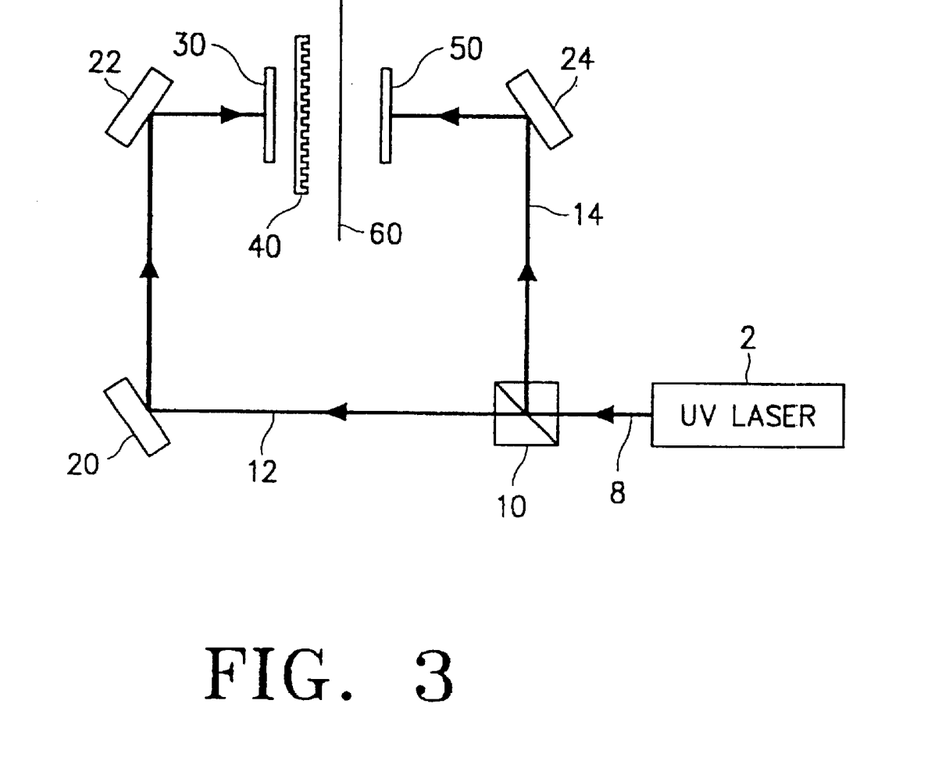
FIG. 3 is a schematic view of an apodized fiber grating fabricating apparatus according to a preferred embodiment of the present invention.

FIG. 3 schematically illustrates the configuration of an apodized fiber grating fabricating apparatus according to a preferred embodiment of the present invention. In FIG. 3, the apodized optical fiber grating fabricating apparatus includes a UV laser 2 as a light source, a beam splitter 10 for splitting a beam 8 emitted from the UV laser 2, a plurality of mirrors 20, 22, and 24 for controlling the direction of beams projected from the beam splitter 10, first and second mobile screen masks 30 and 50 to be used for apodizing a grating when the beams reflected from the mirrors 20, 22, and 24 are projected onto an optical fiber 60, and a phase mask 40 for generating the grating by interference and reinforcement of the projected light.

The beam splitter 10 splits the beam 8 emitted from the UV laser 2 into two beams 12 and 14. One 12 of the beams is reflected from the mirrors 20 and 22 and reaches the first screen mask 30 and the other beam 14 is reflected from the mirror 24 and reaches the second screen mask 50. The two beams 12 and 14 travel mutually orthogonally from the beam splitter 10. The beam 12 is sequentially reflected from the first and second mirrors 20 and 22 and impinges on the phase mask 40. The first mask 30 and second mask 50 are disposed face to face at both sides of the optical fiber 60. The phase mask 40 is interposed between the first screen mask 30 and the optical fiber 60.

The beam 12 is projected onto the phase mask 40 and forms a plurality of gratings in the optical fiber 60 in a predetermined period by reinforcement and interference of light as the beam 12 passes through the phase mask 40. The beam 14 is reflected from the third mirror 24 and reaches the second screen mask 50. Consequently, the beam 8 emitted from the UV laser 2 is concurrently projected onto the first and second screen masks 30 and 50 through the beam splitter 10 and the mirrors 20, 22, and 24. The first and second screen masks 30 and 50 are mobile during the writing process for apodization of the gratings according to the present invention.

Figure 4:
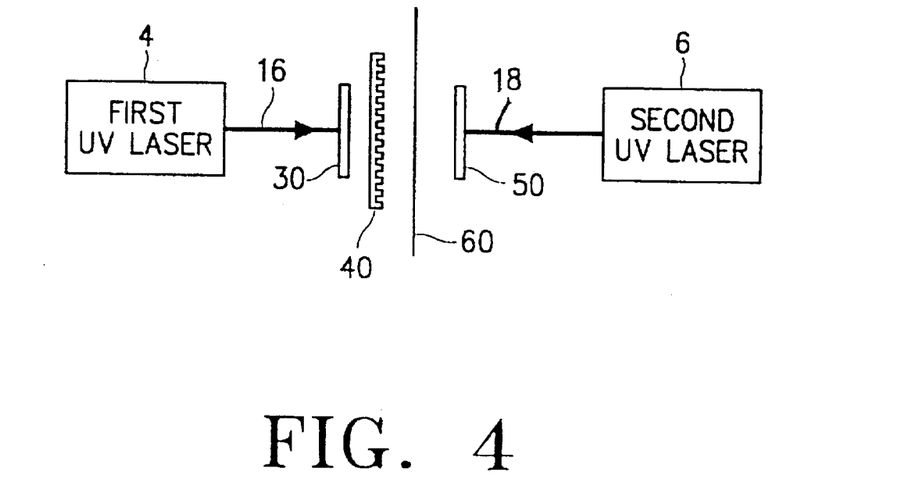
FIG. 4 is a schematic view of an apodized fiber grating fabricating apparatus according to another preferred embodiment of the present invention.

FIG. 4 is a schematic view of an apodized fiber grating fabricating apparatus according to another preferred embodiment of the present invention. While the apodized fiber grating fabricating apparatus of FIG. 3 projects a beam from a UV laser onto an optical fiber in two directions using a beam splitter and a plurality of mirrors, the one shown in FIG. 4 projects a beam onto an optical fiber in two directions using two UV lasers.

Referring to FIG. 4, the apodized fiber grating fabricating apparatus according to the second embodiment of the present invention includes a first UV laser 4 disposed at one side of the optical fiber 60, a second UV laser 6 disposed at the other side of the optical fiber 60, the phase mask 40 through which a beam 16 emitted from the first UV laser 4 passes to write a grating in the optical fiber 60 utilizing light reinforcement and interference, the first screen mask 30 over the phase mask 40 to apodize the fiber grating, and the second screen mask 50 between the second UV laser 6 and the optical fiber 60 to apodize the optical fiber grating. The first and second screen masks 30 and 50 face each other a predetermined distance apart with the interposition of the optical fiber 60. Also, the first and second screen masks 30 and 50 are mobile for apodization of the written grating. The beam 16 emitted from the first UV laser 4 is projected onto the phase mask 40 and forms gratings in the optical fiber 60 in a predetermined period by light reinforcement and interference as it passes through the phase mask 40. The first and second screen masks 30 and 50 apodize the fabricated gratings as they are approaching each other.

The configurations and operations of the first and second screen masks 30 and 50 will be described hereinbelow. It is first to be noted that the first and second screen masks 30 and 50 act to block the light beams and may be formed of any material that is opaque and can block the travel of the beams.

According to the present invention, beams 16 and 18 induced through a plurality of mirrors impinge on the optical fiber 60 from two directions. As the beams 16 and 18 pass through the phase mask 40, they form gratings in the optical fiber 60. Then, the beams 16 and 18 apodize the gratings through the first and second screen masks 30 and 50 while the first and second screen masks 30 and 50 transfer beams with a Gaussian profile to the phase mask 40, moving over a predetermined time.

Figure 5A:
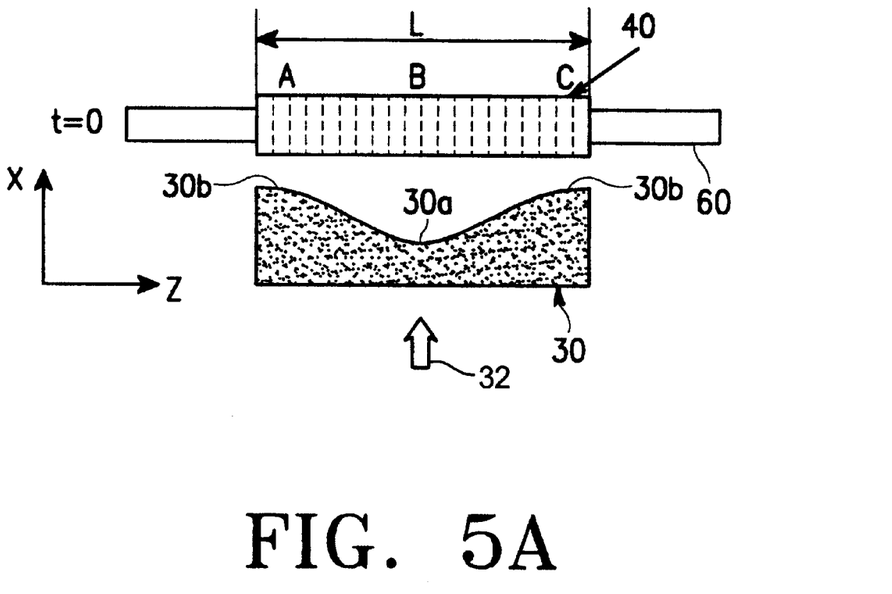
FIG. 5A illustrates the operation of a first screen mask when t=0.
Figure 5B:
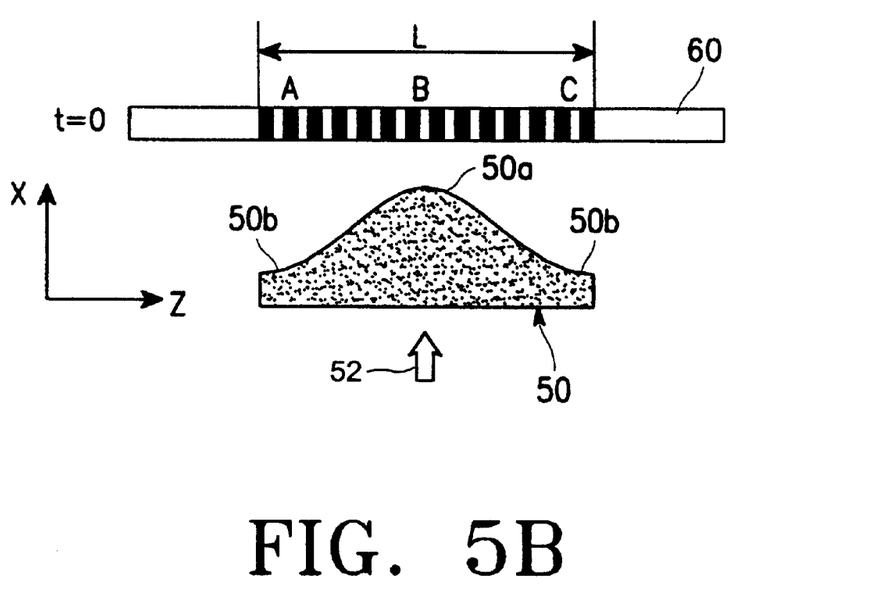
FIG. 5B illustrates the operation of a second screen mask when t=0.
Figure 6A:
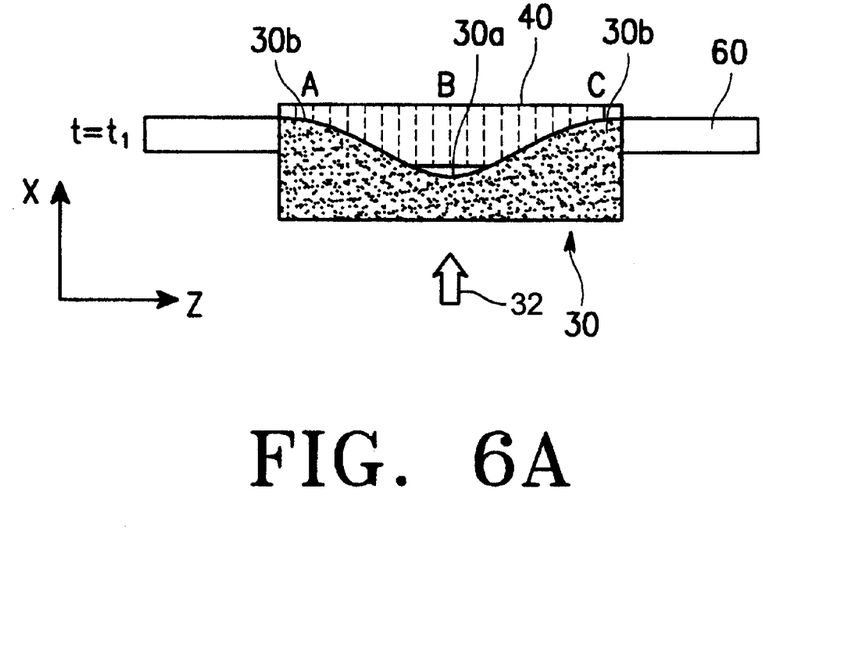
FIG. 6A illustrates the operation of the first screen mask when t=$t_1$.
Figure 6B:
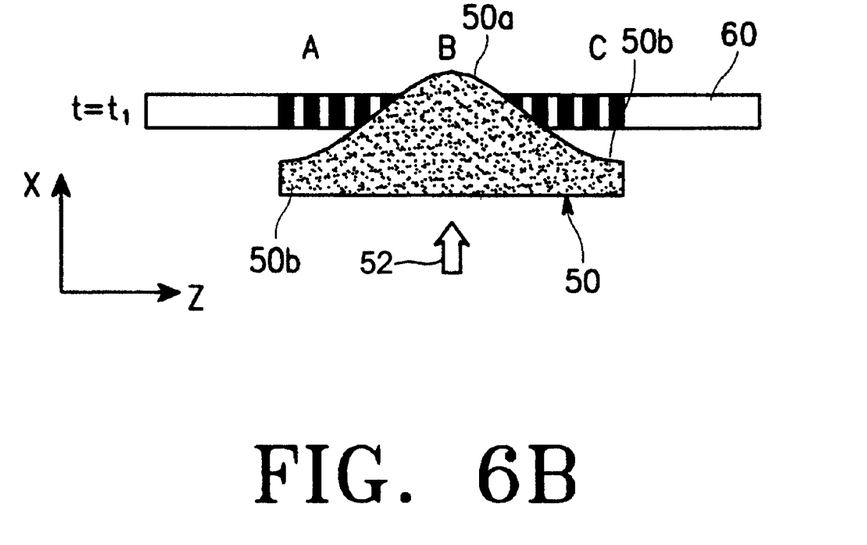
FIG. 6B illustrates the operation of the second screen mask when t=$t_1$.
Figure 7A:
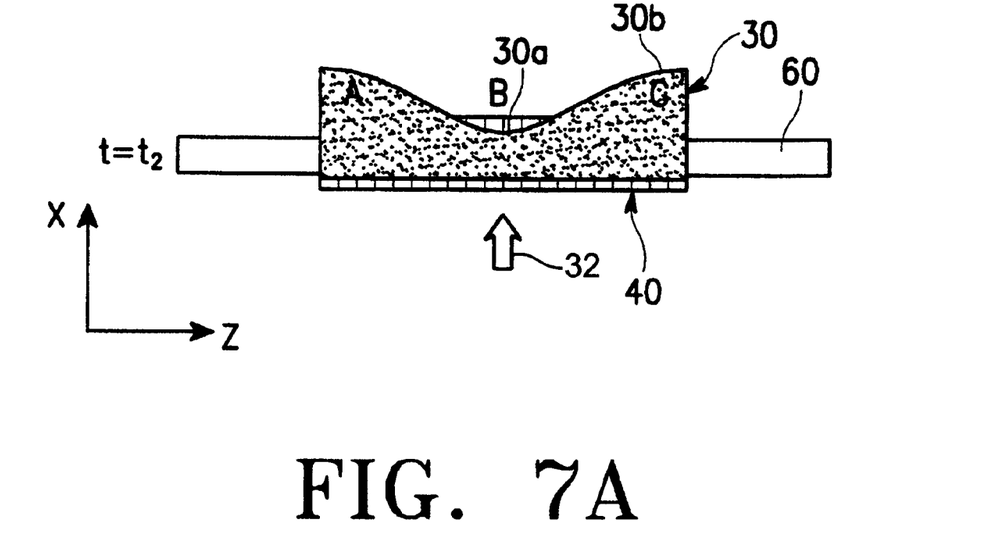
FIG. 7A illustrates the operation of the first screen mask when t=$t_2$.
Figure 7B:
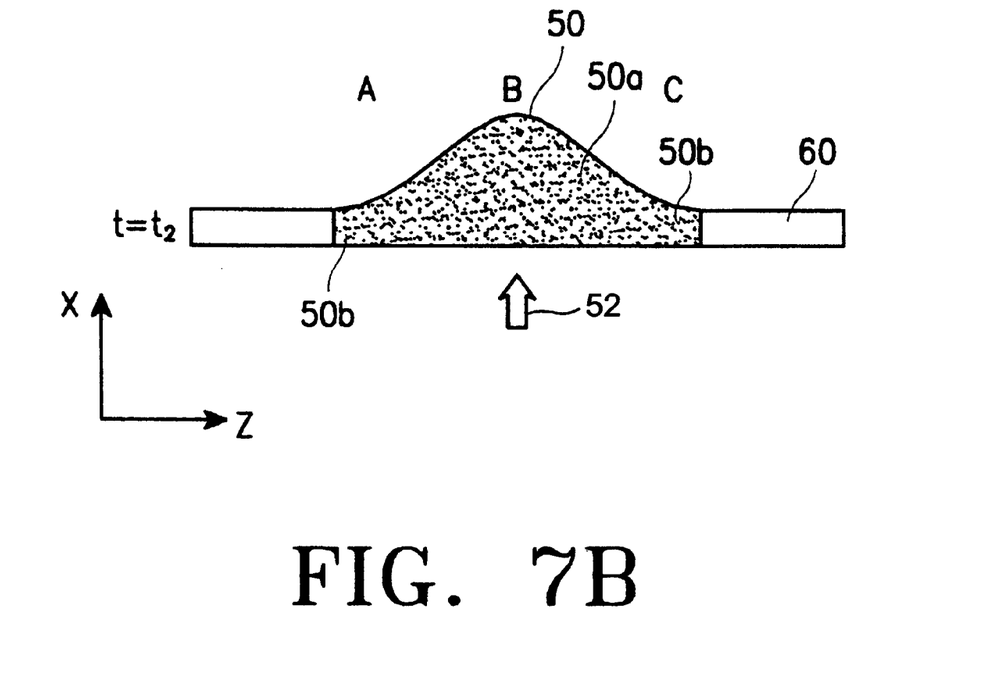
FIG. 7B illustrates the operation of the second screen mask when t=$t_2$.

Referring to FIGS. 5A to 7B, the configuration and operation of the mobile first and second screen masks 30 and 50 will be described in detail. FIGS. 5A and 5B illustrate the operations of the first and second screen masks 30 and 50, respectively when time t=0. FIGS. 6A and 6B illustrate the operations of the first and second screen masks 30 and 50, respectively when $t=t_1$. FIGS. 7A and 7B illustrate the operations of the first and second screen masks 30 and 50, respectively when $t=t_2$.

In the drawings, the X-axis represents the movement direction of the first and second screen masks 30 and 50 and the Z-axis is the length direction of the optical fiber 60. Reference symbol also indicates the movement direction of the first and second screen masks 30 and 50. Reference character L indicates the length of the optical fiber 60 for which gratings are written, reference character B indicates the mid point of L, and reference characters A and C indicate both ends of L.

The first screen mask 30 includes a concave portion 30a at the center and convex portions 30b that are protruded gradually from the concave portion 30a towards both ends of the first screen mask 30. The second screen mask 50 includes a convex portion 50a at the center and concave portions 50b that are sunken gradually from the center towards both ends of the second screen mask 50. The illustrated shapes of the light-blocking edges of screen masks 30 and 50 are essentially complementary to each other, but they need not be. The configurations of the first and second screen masks 30 and 50 in FIGS. 5A to 7B are merely exemplary applications, and it is clear that many variations can be made as far as they are used for apodization of written gratings. For example, the first and second screen masks 30 and 50 can be shaped into steps.

When t=0, a first laser beam emitted from the first UV laser is all projected onto the phase mask 40 and forms a grating in the optical fiber 60 in a predetermined period through the phase mask 40, as shown in FIG. 5A.

Referring to FIG. 6A, when $t=t_1$, i.e., the first screen mask 30 approaches the optical fiber 60 at a predetermined speed, the first screen mask 30 moves in a direction as indicated by_until it covers portions A and C of the optical fiber 60. Therefore, the portions A and C are excluded from irradiation of the first UV laser beam emitted from the first UV laser, whereas a portion B of the optical fiber 60 is irradiated with the first UV laser beam for a predetermined time.

Referring to FIG. 7A, when $t=t_2$, the first screen mask 30 further moves in the direction as indicated by the arrow until it covers all the portions A, B, and C. Hence, the first UV laser beam reaches any of the portions A, B, and C of the optical fiber 60 no longer.

Figure 8:
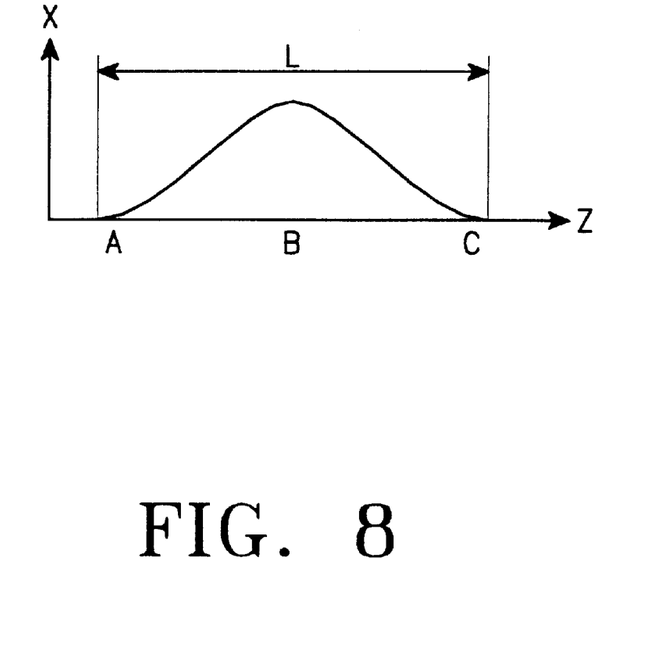
FIG. 8 is a graph showing the variation of a refractive index in the length direction of an apodized fiber grating fabricated using the first screen mask according to the present invention.

As stated above, the intensity of the first laser beam is controlled by progressively covering the phase mask 40 with the first screen mask 30. As a result, a refractive index varies as shown in FIG. 8. FIG. 8 is a graph showing a variation in the refractive index with respect to the length direction of an optical fiber when gratings are formed in the optical fiber using the first screen mask. An X axis represents the variation of the refractive index and a Z axis, the length direction of the optical fiber.

An apodized fiber grating experiences a greater variation in refractive index as it is nearer to the portion B of the optical fiber. On the contrary, the refractive index is less changed as an apodized grating is formed nearer to the portion A or C. As for the second screen mask 50, a second UV laser beam is projected onto the optical fiber 60 with a predetermined width when t=0 as shown in FIG. 5B.

Referring to FIG. 6B, when $t=t_1$, the second screen mask 50 moves in a direction as indicated by the arrow until the portion B of the optical fiber is gradually covered and excluded from irradiation of the second UV laser beam. Meanwhile, the second UV laser beam is projected onto the portions A and C of the optical fiber 60 for a predetermined time.

Referring to FIG. 7B, when $t=t_2$, the second screen mask 50 further moves in the direction as indicated by_until it covers all the portions A, B, and C and thus the second UV laser beam no longer reaches any of the portions A, B, and C.

Figure 9:
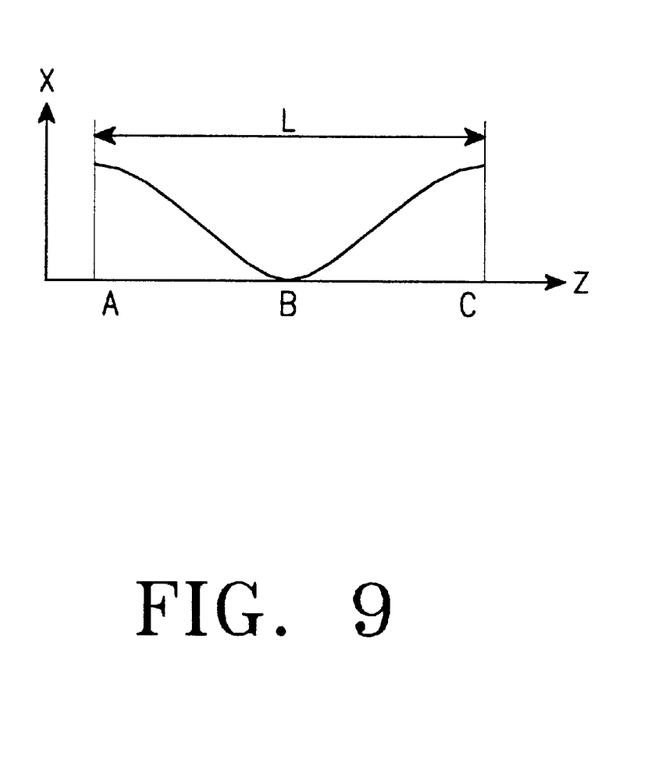
FIG. 9 is a graph showing the variation of refractive index in the length direction of an apodized fiber grating fabricated using the second screen mask according to the present invention.

As stated above, the intensity of the second laser beam is controlled by progressively covering the phase mask 40 with the second screen mask 50. As a result, the refractive index varies as shown in FIG. 9. FIG. 9 is a graph showing a variations in the refractive index with respect to the length direction of an optical fiber when gratings are formed in the optical fiber using the second screen mask. The X-axis represents the variation of the refractive index and the Z-axis represents the length direction of the optical fiber.

An apodized fiber grating experiences a greater variation in refractive index as it is nearer to the portion A or C of the optical fiber. On the contrary, the refractive index is less changed as an apodized grating is formed nearer to the portion B.

Figure 10:
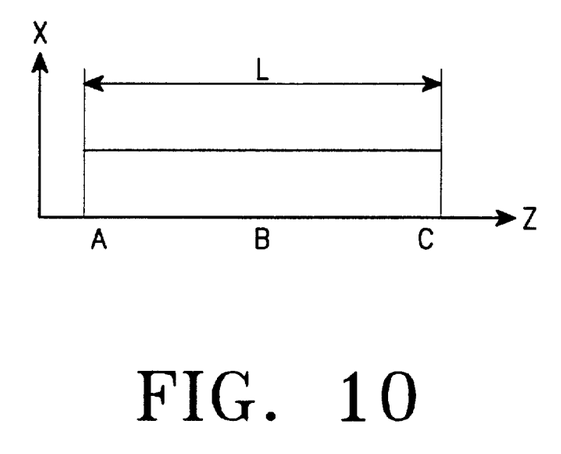
FIG. 10 is a graph showing the variation of a refractive index in the length direction of an apodized fiber grating fabricated by concurrently shifting the first and the second screen masks according to the present invention.

FIG. 10 is a graph showing a variations in refractive index in the length direction of a fiber grating when the grating is written in an optical fiber by projecting a UV laser beam onto the optical fiber from two directions, moving the first and second screen masks 30 and 50 concurrently.

Figure 11:
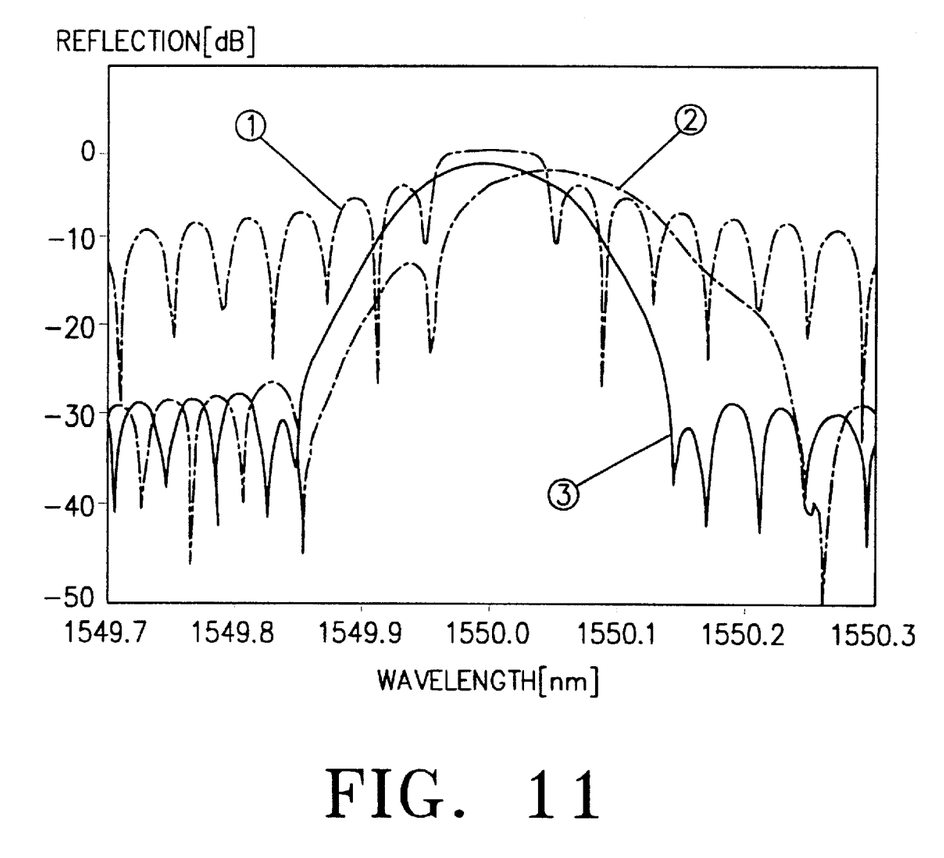
FIG. 11 illustrates the reflective spectrums of fiber gratings with respect to the refractive index variations shown in FIGS. 1, 2, and 9.

Apodization is achieved in the grating by setting an average refractive index to be constant along the length of the fiber grating as shown in FIG. 10, and sidelobes in short and long wavelength bands are minimized as shown in FIG. 11. That is, the total exposure to the first and second beams is the same at any point along the length of the fiber grating.

The characteristics of an apodized fiber grating according to the present invention will be described referring to FIG. 11. In FIG. 11, the one-dot-dashed line (1) indicates the reflective spectrum of a general optical fiber fabricated using a uniform mask as shown in FIG. 1.

Another one-dot-dashed line (2) indicates the reflective spectrum of an apodized fiber grating of which the refractive index varies as shown in FIG. 2. As noted from (2), it is difficult to minimize a sidelobe in a short wavelength band.

A solid line (3) indicates the reflective spectrum of an apodized fiber grating at wavelengths according to the present invention. Sidelobes in short and long wavelength bands are reduced.

As described above, an apodized fiber grating fabricating apparatus of the present invention forms apodized fiber gratings readily using a beam splitter and screen masks in addition to an existing optical equipment and phase mask, instead of separately procuring a new apodizing phase mask at every change in apodization conditions, or the beam scanning method having the disadvantages of difficult fabrication, long fabrication time, and bad reproducibility. Further, an apodized fiber grating can be written easily by the use of two UV lasers.

The present invention has been described in the context with an apodized fiber grating fabricating apparatus having two screen masks as beam blocking means, but the number of the screen masks is not limited so long as an average refractive index variation is constant over the entire apodized fiber gratings.

While the invention has been shown and described with reference to certain preferred embodiments thereof, it will be understood by those skilled in the art that various changes in form and details may be made therein without departing from the spirit and scope of the invention as defined by the appended claims.

As described above, an apodized fiber grating fabricating apparatus of the present invention forms apodized fiber gratings readily using a beam splitter and screen masks in addition to an existing optical equipment and phase mask, instead of separately procuring a new apodizing phase mask at every change in apodization conditions, or the beam scanning method having the disadvantages of difficult fabrication, long fabrication time, and bad reproducibility.

What is claimed is:

1. An apparatus for fabricating an apodized fiber grating, comprising:

an ultraviolet laser for emitting an ultraviolet laser beam;

a beam splitter for splitting the ultraviolet laser beam emitted from the ultraviolet laser into two beams;

a plurality of mirrors for forming light paths to concurrently project the split beams onto an optical fiber from two directions by reflecting the split beams;

a phase mask for passing one of the reflected beams to form gratings in the optical fiber in a predetermined period;

a first blocking device disposed between the phase mask and one of the mirrors;

first moving means for moving the first blocking device so as to progressively block said one of the reflected beams from being projected toward the optical fiber from one direction and providing apodization to the formed gratings;

a second blocking device which is disposed opposite to the first blocking device with respect to the optical fiber; and second moving means for moving the second blocking device so as to progressively block another of the reflected beams from being projected toward the optical fiber from another direction, and providing apodization to the formed gratings, so that an average refractive index variation is constant across all of the gratings.

2. The apparatus of claim 1, wherein the first blocking device is a first screen mask.

3. The apparatus of claim 2, wherein the first screen mask includes:
- a concave portion at a center of the first screen mask for providing apodization to the formed gratings; and
- two convex portions gradually protruding from the concave portion toward respective ends of the first screen mask.

4. The apparatus of claim 1, wherein the second blocking device is a second screen mask.

5. The apparatus of claim 4, wherein the second screen mask includes:
- a convex portion at a center of the second screen mask; and
- two concave portions gradually sunken from the convex portion toward respective ends of the second screen mask.

6. An apparatus for fabricating an apodized fiber grating, comprising:
- a first ultraviolet laser for emitting a first ultraviolet laser beam toward an optical fiber from one direction;
- a second ultraviolet laser for emitting a second ultraviolet laser beam toward the optical fiber from an opposite direction;
- a phase mask for forming gratings in the optical fiber in a predetermined period by reinforcement and interference of the first ultraviolet laser beam
- a first blocking device disposed between the first ultraviolet laser and the phase mask
- first moving means for moving the first blocking device so as to progressively block the first ultraviolet laser beam from being projected to the optical fiber and thus providing apodization to the formed gratings;
- a second blocking device disposed opposite to the first blocking device with respect to the optical fiber; and
- second moving means for moving the sceond blocking device so as to progressively block the second ultraviolet laser beam from being projected to the optical fiber and providing apodization to the formed gratings, so that an average refractive index variation is constant across all of the gratings.

7. The apparatus of claim 6, wherein the first blocking device is a first screen mask.

8. The apparatus of claim 7, wherein the first screen mask includes:
- a concave portion at a center of the first screen mask for providing apodization to the formed gratings; and
- two convex portions gradually protruding from the concave portion toward respective ends of the first screen mask.

9. The apparatus of claim 6, wherein the second blocking device is a second screen mask.

10. The apparatus of claim 9, wherein the second screen mask includes:
- a convex portion at a center of the second screen mask; and
- two concave portions gradually sunken from the convex portion toward respective ends of the second screen mask.

11. An apparatus for fabricating an apodized fiber grating, comprising:
- means for providing a first ultraviolet laser beam and a second ultraviolet laser beam to project onto respective opposite sides of an optical fiber;
- a phase mask interposed in the first ultraviolet laser beam for forming a grating in the optical fiber by light interference;
- a first screen mask having a first shape and interposed in the first ultraviolet laser beam for selectively blocking light along a length of the optical fiber, said phase mask being interposed between the first screen mask and the optical fiber;
- a second screen mask having a second shape and interposed in the second ultraviolet laserbeam for selectivelyblocking light in a pattern complementary to that ofthc first screen mask; and
- means for moving said first screen mask and said second screen mask during writing of a grating in the optical fiber, and for progressively exposing the optical fiber to varying light profiles during the writing;
- wherein said means for moving said first screen mask and said second screen mask moves at least one of the first and second screen masks independently and linearly in a direction approximately perpendicular to a length of the optical fiber for selectively blocking light to a portion of the optical fiber in which the grating is formed.

12. The apparatus of claim 11, said means for providing the first ultraviolet laser beam and the second ultraviolet laser beam comprising:
- an ultraviolet laser for providing light;
- a beam splitter for splitting the light of said ultraviolet laser into said first ultraviolet laser beam and said second ultraviolet laser beam; and
- means for directing the first and second ultraviolet laser beams to project onto respective opposite sides of the optical fiber.

13. The apparatus of claim 11, said means for providing a first ultraviolet laser beam and a second ultraviolet laser beam comprising:
- a first ultraviolet laser for providing said first ultraviolet laser beam; and
- a second ultraviolet laser for providing said second ultraviolet laser beam.

14. The apparatus of claim 11, said first shape and said second shape each being selected to deliver a Gaussian light profile to a portion of the optical fiber in which the grating is formed.

15. The apparatus of claim 14, said first shape having a light-blocking edge having a Gaussian curve.

16. The apparatus of claim 14, said first shape having a light-blocking edge shaped into steps.

17. The apparatus of claim 12, said means for directing the first and second ultraviolet laser beams comprising a plurality of mirrors.

18. The apparatus of claim 14, said second shape being approximately complementary to said first shape for selectively blocking light in a pattern complementary to that of the first screen mask.

19. The apparatus of claim 14, said first shape having a concave portion at a center of the first screen mask and two convex portions that protrude gradually toward respective ends of the first screen mask.

20. A method for fabricating an apodized fiber grating, comprising the steps of directing a first ultraviolet laser beam to project through a first screen mask and a phase mask onto one side of an optical fiber so as to form a grating in the optical fiber;

directing a second ultraviolet laser beam to project through a second screen mask onto another side of the optical fiber;

moving said first screen mask to progressively block said first ultraviolet laser beam in a time-varying manner to yield a Gaussian exposure profile along a length of the optical fiber in which the grating is formed; and simultaneously moving said second screen mask to progressively block said second ultraviolet laser beam to yield a Gaussian exposure profile complementary to the Gaussian exposure profile resulting from moving of the first screen mask, thereby yielding a constant refractive index variation across all of the grating;

said step of moving said first screen mask further comprising moving said first screen mask linearly in a direction approximately perpendicular to a length of the optical fiber.

21. The method of claim, further comprising the step of:
passing light from an ultraviolet laser through a beam splitter to produce said first ultraviolet laser beam and said second ultraviolet laser beam.

22. The method of claim 20, said first screen mask having a light-blocking edge in the shape of a Gaussian curve.

23. The method of claim 20, said first screen mask having a light-blocking edge in the shape of steps.

24. The method of claim 20, said first screen mask having a light-blocking edge which is complementary in shape to a light-blocking edge of said second screen mask.

25. The method of claim 24, said first screen mask having a concave portion at a center of the first screen mask and two convex portions that protrude gradually toward respective ends of the first screen mask.

26. The method of claim 24, said steps of moving said first and second screen masks further comprising:
moving said first and second screen masks in directions which are parallel to each other.

27. The apparatus of claim 14, said second shape having a convex portion at a center of the second screen mask and two concave portions that gradually sink from the convex portion toward respective ends of the second screen mask.

28. An apparatus for fabricating an apodized fiber grating, comprising:
an ultraviolet laser for emitting an ultraviolet laser beam;
a beam splitter for splitting the ultraviolet laser beam emitted from the ultraviolet laser into two beams;
a plurality of mirrors for forming light paths to concurrently project the split beams onto an optical fiber from two directions by reflecting the split beams;
a phase mask for passing one of the reflected beams to form gratings in the optical fiber in a predetermined period;
a first blocking device disposed between the phase mask and one of the mirrors for progressively blocking said one of the reflected beams from being projected toward the optical fiber from one direction and providing apodization to the formed gratings; and
a second blocking device which is disposed opposite to the first blocking device with respect to the optical fiber for progressively blocking another of the reflected beams from being projected toward the optical fiber from another direction, and providing apodization to the formed gratings, so that an average refractive index variation is constant across all of the gratings;
wherein the first blocking device is a first screen mask which includes a concave portion at a center of the first screen mask for providing apodization to the formed grating and two convex portions gradually protruding from the concave portion toward respective ends of the first screen mask.

29. The apparatus of claim 28, wherein the second blocking device is a second screen mask which includes a convex portion at a center of the second screen mask, and two concave portions gradually sunken from the convex portion toward respective ends of the second screen mask.

30. An apparatus for fabricating an apodized fiber grating, comprising:
an ultraviolet laser for emitting an ultraviolet laser beam
a beam splitter for splitting the ultraviolet laser beam emitted from the ultraviolet laser into two beams;
a plurality of minors for forming light paths to concurrently project the split beams onto an optical fiber from two directions by reflecting the split beams;
a phase mask for passing one of the reflected beams to form gratings in the optical fiber in a predetermined period;
a first blocking device disposed between the phase mask and one of the mirrors for progressively blocking said one of the reflected beams from being projected toward the optical fiber from one direction and providing apodization to the formed gratings; and
a second blocking device which is disposed opposite to the first blocking device with respect to the optical fiber for progressively blocking another of the reflected beams from being projected toward the optical fiber from another direction, and providing apodization to the formed gratings, so that an average refractive index variation is constant across all of the gratings;
wherein the second blocking device is a second screen mask which includes a convex portion at a center of the second screen mask, and two concave portions gradually sunken from the convex portion toward respective ends of the second screen mask.

31. An apparatus for fabricating an apodized fiber grating, comprising:
a first ultraviolet laser for emitting a first ultraviolet laser beam toward an optical fiber from one direction;
a second ultraviolet laser for emitting a second ultraviolet laser beam toward the optical fiber from an opposite direction;
a phase mask for forming gratings in the optical fiber in a predetermined period by reinforcement and interference of the first ultraviolet laser beam;
a first blocking device disposed between the first ultraviolet laser and the phase mask for progressively blocking the first ultraviolet laserbeam from being projected to the optical fiber and thus providing apodization to the formed gratings; and
a second blocking device disposed opposite to the first blocking device with respect to the optical fiber for progressively blocking the second ultraviolet laser beam from being projected to the optical fiber, and providing apodization to the formed gratings, so that an average refractive index variation is constant across all of the gratings;
wherein the first blocking device is a first screen mask which includes a concave portion at a center of the first screen mask for providing apodization to the formed gratings, and two convex portions gradually protruding from the concave portion toward respective ends of the first screen mask.

32. The apparatus of claim 31, wherein the second blocking device is a second screen mask which includes a convex portion at a center of the second screen mask, and two concave portions gradually sunken from the convex portion toward respective ends of the second screen mask.

33. An apparatus for fabricating an apodized fiber grating, comprising:

a first ultraviolet laser for emitting a first ultraviolet laser beam toward an optical fiber from one direction;

a second ultraviolet laser for emitting a second ultraviolet laser beam toward the optical fiber from an opposite direction;

a phase mask for forming gratings in the optical fiber in a predetermined period by reinforcement and interference of the first ultraviolet laser beam a first blocking device disposed between the first ultraviolet laser and the phase mask for progressively blocking the first ultraviolet laserbeam from being projected to the optical fiber and thus providing apodization to the formed gratings; and a second blocking device disposed opposite to the first blocking device with respect to the optical fiber for progressively blocking the second ultraviolet laser beam from being projected to the optical fiber, and providing apodization to the formed gratings, so that an average refractive index variation is constant across all of the gratings;

wherein the second blocking device is a second screen mask which includes a convex portion at a center of the second screen mask, and two concave portions gradually sunken from the convex portion toward respective ends of the second screen mask.

34. An apparatus for fabricating an apodized fiber grating, comprising:

means for providing a first ultraviolet laser beam and a second ultraviolet laser beam to project onto respective opposite sides of an optical fiber;

a phase mask interposed in the first ultraviolet laser beam for forming a grating in the optical fiber by light interference;

a first screen mask having a first shape and interposed in the first ultraviolet laser beam for selectivelybloeking light along a length of the optical fiber, said phase mask being interposed between the first screen mask and the optical fiber;

a second screen mask having a second shape and interposed in the second ultraviolet laser beam for selectivelyblocking light in apattern complementary to that ofthe first screen mask; and means for moving said first screen mask and said second screen mask during writing of a grating in the optical fiber, and for progressively exposing the optical fiber to varying light profiles during the writing;

said first shape having alight-blocking edge shaped into steps.

35. A method for fabricating an apodized fiber grating, comprising the steps of:

directing a first ultraviolet laser beam to project through a first screen mask and a phase mask onto one side of an optical fiber so as to form a grating in the optical fiber;

directing a second ultraviolet laserbeam to project through a second screenmask onto another side of the optical fiber;

moving said first screen mask to progressively block said first ultraviolet laser beam in a time-varying manner to yield a Gaussian exposure profile along a length of the optical fiber in which the grating is formed;

simultaneously moving said second screen mask to progressively block said second ultraviolet laser beam to yield a Gaussian exposure profile complementary to the Gaussian exposure profile resulting from moving of the first screen mask, thereby yielding a constant refractive index variation across all of the grating; and providing said first screen mask with a light-blocking edge in the shape of steps.

* * * * *